US010839126B1

(12) United States Patent
Khomenko et al.

(10) Patent No.: US 10,839,126 B1
(45) Date of Patent: Nov. 17, 2020

(54) TOOLS AND METHODS FOR SELECTION OF RELATIVE TIMING CONSTRAINTS IN ASYNCHRONOUS CIRCUITS, AND ASYNCHRONOUS CIRCUITS MADE THEREBY

(71) Applicant: Dialog Semiconductor (UK) Limited, London (GB)

(72) Inventors: Viktor Khomenko, Newcastle upon Tyne (GB); Danil Sokolov, Newcastle upon Tyne (GB); Alex Yakovlev, Newcastle upon Tyne (GB)

(*) Notice: Subject to any disclaimer, the term of this patent is extended or adjusted under 35 U.S.C. 154(b) by 0 days.

(21) Appl. No.: 16/382,938

(22) Filed: Apr. 12, 2019

(51) Int. Cl.
G06F 30/35 (2020.01)
G06F 111/04 (2020.01)
G06F 119/12 (2020.01)

(52) U.S. Cl.
CPC .......... G06F 30/35 (2020.01); *G06F 2111/04* (2020.01); *G06F 2119/12* (2020.01)

(58) Field of Classification Search
CPC ... G06F 30/35; G06F 2111/04; G06F 2119/12
USPC ........................................ 716/108
See application file for complete search history.

(56) References Cited

U.S. PATENT DOCUMENTS

| | | | |
|---|---|---|---|
| 3,824,409 A | 7/1974 | Patil | |
| 5,469,367 A | 11/1995 | Puri et al. | |
| 6,237,127 B1 * | 5/2001 | Craven | G06F 30/3312 |
| | | | 716/108 |
| 6,314,553 B1 * | 11/2001 | Stevens | G06F 30/35 |
| | | | 716/104 |
| 6,367,056 B1 | 4/2002 | Lee | |
| 7,454,727 B1 | 11/2008 | Cemy et al. | |
| 7,650,581 B2 | 1/2010 | Rahim et al. | |
| 7,904,867 B2 | 3/2011 | Burch et al. | |
| 8,073,670 B2 | 12/2011 | Kimata | |
| 8,775,989 B2 | 7/2014 | Gangadharan et al. | |
| 8,839,162 B2 | 9/2014 | Amundson et al. | |
| 9,298,872 B2 | 3/2016 | Nam et al. | |

(Continued)

OTHER PUBLICATIONS

"Qualifying Relative Timing Constraints for Asynchronous Circuits," by Jotham Vaddaboina Manoranjan et al., 2016 22nd IEEE International Symposium on Asynchronous Circuits and Systems (ASYNC), May 8-11, 2016, pp. 91-98.

(Continued)

*Primary Examiner* — Suresh Memula
(74) *Attorney, Agent, or Firm* — Saile Ackerman LLC; Stephen B. Ackerman

(57) ABSTRACT

A method of selecting relative timing constraints for enforcing in an asynchronous circuit is presented. The method includes selecting one or more sets of relative timing constraints, which include a first set of relative timing constraints, wherein the first set of relative timing constraints meets the following criteria: i) the first set is suitable for preventing the asynchronous circuit from entering two or more bad states in which a correctness property of the asynchronous circuit is violated, and ii) the first set comprises a plurality of relative timing constraints, wherein each relative timing constraint within the first set is associated with a bad state whose associated relative timing constraints comprise this relative timing constraint but no other relative timing constraint that is implied by another relative timing constraint in the first set.

21 Claims, 10 Drawing Sheets

(56) References Cited

U.S. PATENT DOCUMENTS

| | | | |
|---|---|---|---|
| 9,977,845 B2 | 5/2018 | Kim | |
| 2007/0130486 A1 | 6/2007 | Lindberg | |
| 2008/0288904 A1 | 11/2008 | Rahim et al. | |
| 2009/0106719 A1* | 4/2009 | Stevens | G06F 30/35 716/113 |
| 2011/0161902 A1* | 6/2011 | Stevens | G06F 30/3323 716/108 |
| 2014/0165022 A1* | 6/2014 | Stevens | G06F 30/327 716/134 |
| 2015/0026653 A1* | 1/2015 | Stevens | G06F 30/327 716/108 |
| 2016/0217245 A1 | 7/2016 | Gregerson et al. | |

OTHER PUBLICATIONS

"Abstract Interpretation Techniques for the Verification of Timed Systems," Dissertation by Robert Clariso Viladrosa, Jun. 2005, Universitat Politecnica de Catalunya, Barcelona, 165 pages.
"Satisfiability modulo theories," Wikipedia, Apr. 12, 2019, pp. 1-8, found: https://en.wikipedia.org/wiki/Satisfiability_modulo_theories.
"Integer programming," Wikipedia, Apr. 12, 2019, pp. 1-6, found: https://en.wikipedia.org/wiki/Integer_programming.
"Branch and bound," Wikipedia, Apr. 12, 2019, pp. 1-4, found: https://en.wikipedia.org/wiki/Branch_and_bound.
"Boolean satisfiability problem," Wikipedia, Apr. 12, 2019, pp. 1-13, found: https://en.wikipedia.org/wiki/Boolean_satisfiability_problem.

* cited by examiner

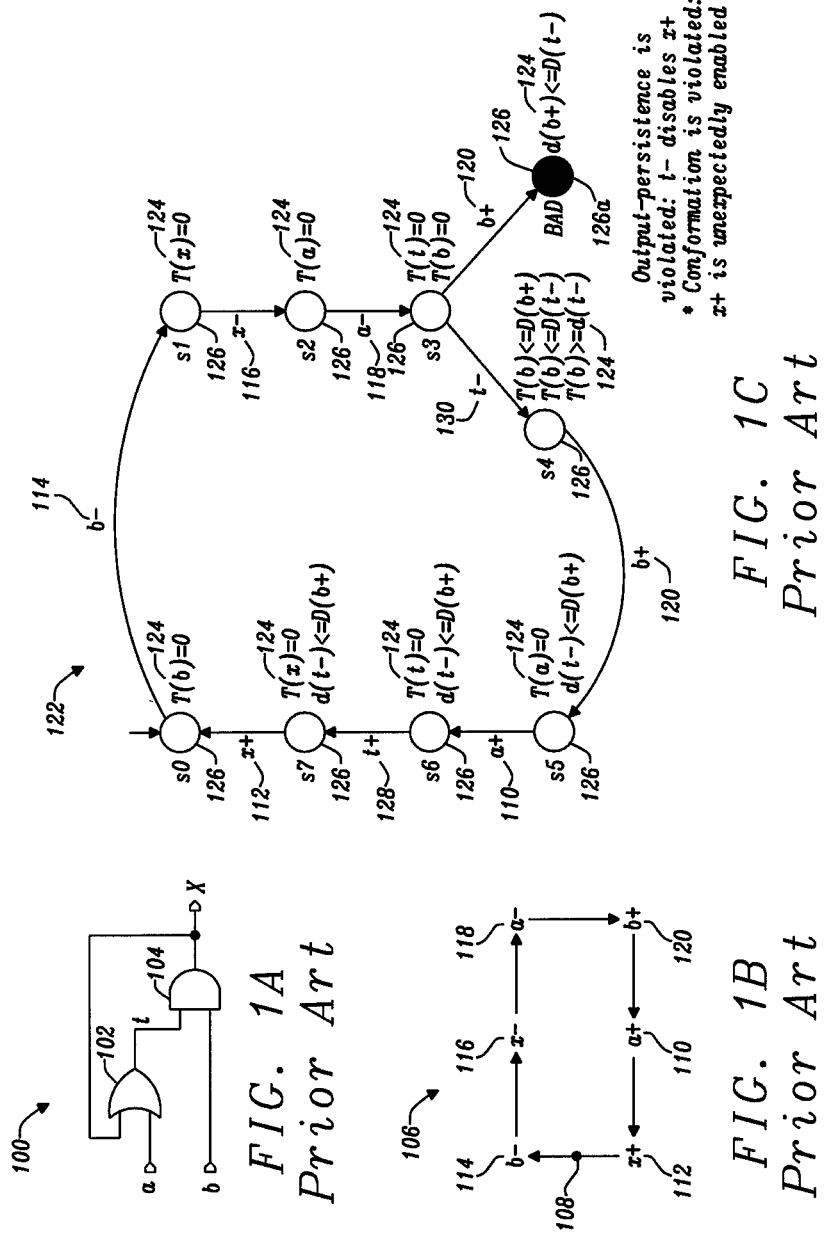

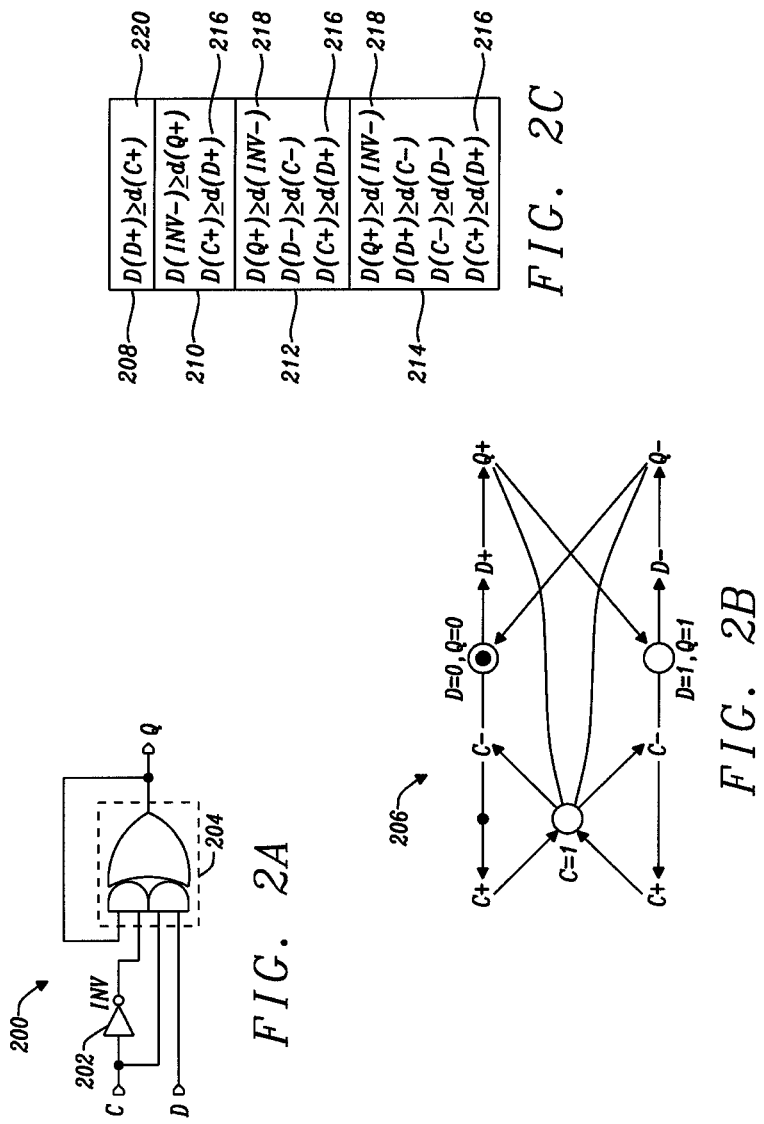

FIG. 4C

| | Constraints | Margin | |
|---|---|---|---|
| $O_1$ (438) | $D(g1-) < d(lds-) + d(d-)$ ~444<br>$D(dtack-) < d(lds-)$ ~456 | 0<br>-1 | A<br>B |
| $O_2$ (440) | $D(g1-) < d(dtack-) + d(d-) + d(dsr+)$ ~448<br>$D(lds-) < d(dsr+) + d(dtack-)$ ~452 | 2<br>1 | C<br>D |
| $O_3$ (442) | $D(g1-) < d(lds-) + d(d-)$ ~444<br>$D(g1-) < d(dtack-) + d(d-)$ ~446<br>$D(lds-) < d(dtack-)$ ~450<br>$D(dtack-) + D(dsr+) < d(lds-)$ ~454 | 0<br>0<br>-1<br>-5 | A<br>E<br>F<br>G |

447

| Solution Number | Min Margin | Constraints |
|---|---|---|
| 1 | 0 | AC |
| 2 | 0 | ACD |
| 3 | 0 | AD |
| 4 | 0 | ADE |
| 5 | 0 | AE |
| 6 | -1 | ACF |
| 7 | -1 | ABC |
| 8 | -1 | ABE |
| 9 | -1 | AFE |
| 10 | -1 | BE |
| 11 | -1 | AF |
| 12 | -1 | ABCD |
| 13 | -1 | BDE |
| 14 | -1 | ABDE |
| 15 | -1 | ABD |
| 16 | -5 | ACG |
| 17 | -5 | CG |
| 18 | -5 | AEG |
| 19 | -5 | EG |

FIG. 4D

| Solution Number | Min Margin | Constraints |
|---|---|---|
| 1 | 0 | AC |
| 3 | 0 | AD |
| 5 | 0 | AE |
| 10 | -1 | BE |
| 11 | -1 | AF |
| 17 | -5 | CC |
| 19 | -5 | EG |

TOOLS AND METHODS FOR SELECTION OF RELATIVE TIMING CONSTRAINTS IN ASYNCHRONOUS CIRCUITS, AND ASYNCHRONOUS CIRCUITS MADE THEREBY

The present disclosure relates to tools and methods for selection of relative timing constraints in asynchronous circuits, and asynchronous circuits made thereby.

BACKGROUND

Timing constraints are conditions on the delays of circuit elements that may be required to prevent the circuit from entering unwanted states. Relative timing constraints (RTCs) are a type of timing constraint that expresses that a total delay of a subset of a circuit's components is always smaller than a total delay of another subset of the circuit's components. This is in contrast with absolute timing constraints which impose numeric bounds on delays of subsets of components. The use of RTCs ensures that the circuit functions in accordance with its specification, and in effect, operates correctly. The present disclosure relates to RTCs for asynchronous circuits.

FIG. 1A is a schematic of a logic circuit 100 that requires timing constraints to work correctly. The logic circuit 100 comprises an OR gate 102 and an AND gate 104. It can be observed that the logic circuit 100 receives input signals a, b and provides an output signal x. Additionally, the OR gate 102 outputs an internal signal t that is not provided at an output of the logic circuit 100.

The desired behaviour of an asynchronous circuit can be formally specified using a Signal Transition Graph (STG) that captures the interactions between the asynchronous circuit and its environment. Where a system comprises an asynchronous circuit, the environment of the asynchronous circuit is in reference to the rest of the system. STGs are a type of Petri net in which transitions are labelled with the rising edges (denoted by a "+") and falling edges (denoted by a "−") of circuit signals. The arcs indicate the sequencing of transitions, and the tokens mark the initial state. FIG. 1B is an STG 106 that formally specifies the desired interaction between the logic circuit 100 and its environment. Shown in FIG. 1B are a token 108, a rising edge of input signal a 110, a rising edge of output signal x 112, a falling edge of input signal b 114, a falling edge of output signal x 116, a falling edge of input signal a 118 and a rising edge of input signal b 120.

Given an STG as the specification, one can derive an asynchronous circuit implementing it, either manually or with help of tools which automate a circuit design process, in whole or in part. Given an STG and an asynchronous circuit, one can formulate various properties defining the correctness of the circuit with respect to its specification given by the STG. One of the correctness properties for asynchronous circuits is output-persistence, meaning that any logic gate, once enabled, must complete its switching without being disabled. If the output-persistence is violated for some logic gate then this gate can produce a non-digital pulse on its output, and thus cause the circuit to malfunction. Another common correctness property for asynchronous circuits is conformation to its environment, meaning that the asynchronous circuit must not produce an output signal that is unexpected by the environment at that moment. If conformation is violated, the unexpected signal may cause the environment to malfunction. Other correctness properties can also be formulated.

It may happen that the asynchronous circuit satisfies the required correctness properties with respect to the given specification STG only if some RTCs about the asynchronous circuit's components are satisfied, e.g. one subset of components is always faster than another subset of components. Computing the set of RTCs ensuring the correct operation of the asynchronous circuit, so that they can be enforced later in the design process, is a necessary design step.

There are several stages in the derivation of RTCs. Initially a state graph (or some portion thereof) of the composition of the circuit with the specification STG is derived and timing analysis is performed to allocate each reachable state one or more timing constraints, which may be understood as a system of simultaneous constraints on the possible timings of events which must be satisfied to reach that state. One potential method for the timing analysis is the fix-point algorithm as disclosed in Abstract Interpretation Techniques for the Verification of Timed Systems (PhD Thesis) by Robert Clarisó Viladrosa.

FIG. 1C is a portion of a state graph 122 of the composition of logic circuit 100 with the specification STG 106, with timing constraints 124 attached to each state 126. Also shown is a rising edge 128 and a falling edge 130 of the output signal t. A bad state 126a is shown (also labelled as BAD). Any behaviour following the bad state 126a is unnecessary for the timing analysis and therefore is removed from the state graph 122. The states 126 are labelled individually as follows: s0, s1, s2, s3, s4, s5, s6, s7, and BAD.

The bad state 126a denotes a state where output-persistence is violated. Output-persistence is violated as the falling edge of the internal signal t disables the rising edge of the output signal x. Additionally, conformation is violated as the rising edge of the output signal x is unexpectedly enabled. Violation of even one correctness property is enough to designate a state as bad. Therefore, we may define a bad state as being a state in which at least one correctness property is violated. Output persistence and conformation are examples of correctness properties. In the present example, a correctness property is violated when either one of the output-persistence and the conformation is violated.

It will be appreciated that there may be other correctness properties in accordance with the understanding of the skilled person. The correctness properties may be defined by the asynchronous circuit designer and may be specific to a circuit.

The only timing constraint associated with the bad state 126a is $d(b+) \leq D(t-)$. The uppercase "D" denotes the maximal possible delay of a signal or a signal edge, and a lowercase "d" denotes the minimal possible delay of a signal or a signal edge. Within the parenthesis is the associated signal or signal edge using the conventional STG notation to denote rising and falling edges. For example, $d(b+)$ refers to the minimal delay of the rising edge of the input signal b. A delay is the time taken for a transition at an input of a logic gate to impact an output provided by the logic gate. Hence, this timing constraint expresses that to enter the bad state, the minimal delay of the rising edge of the input signal b should be smaller or equal to the maximal delay of the falling edge of signal t.

In the state s3, the falling edge of the output signal t (t−) and the rising edge of the input signal b (b+) become enabled. The falling edge of the output signal t (t−) and the rising edge of the input signal b (b+) may be referred to as being "events". As these events become enabled, the timers for each of these events are reset to zero. As no other events are enabled, the set of constraints for the state s3 is therefore {T(t)=0, T(b)=0}. The uppercase "T" is used to denote a timer for the signal within the parenthesis.

In the state s4, only the rising edge of b (b+) is enabled, and there are constraints on the value of its timer T(b) as follows: T(b)≤D(b+) conveys that the value of the timer T(b) cannot exceed the maximum possible firing time of the rising edge of b (b+); and d(t−)≤T(b)≤D(t−) are because the value of the timer T(b) in the state s3 was zero and the firing of the arc from the state s3 to the state s4 labelled by the falling edge of the output signal t (t−) took at least d(t−) and at most D(t−).

For more complicated examples there are likely to be several bad states, such as the state 126a, in a state graph, and it is desirable to ensure that none of them can be reached during operation of the asynchronous circuit. This may be achieved by selecting an appropriate set of RTCs that guarantee any bad states are unreachable during operation, and enforcing them later in the design process.

To remove a single bad state, it is enough to pick any timing constraint from the associated system of timing constraints (which all hold simultaneously if the state is entered) and invert it by "flipping" the relation sign. For example, the bad state the state graph 122 can be removed by picking its only constraint d(b+) D(t−) and flipping its sign, yielding the RTC d(b+)>D(t−) that can be taken as the timing assumption guaranteeing the correct operation of the logic circuit 100 with respect to that particular bad state. The timing in the bad state is incompatible with this RTC, so if this RTC holds then the bad state cannot be entered.

If there are several bad states, one can simply pick a timing constraint from each of them and flip their relation signs to define a set of RTCs. However, sometimes picking a single timing constraint can remove several bad states due to the same timing constraint being shared by multiple bad states or due to one timing constraint logically implying another. There are typically many ways of selecting such a set of RTCs that can eliminate all bad states.

When the physical implementation of the asynchronous circuit is being derived, the RTCs are enforced by the inclusion of physical components and component arrangements that impose the RTCs on the asynchronous circuit, thereby making it physically impossible to enter a bad state in normal operation. It can be simpler to enforce certain RTCs within an asynchronous circuit than other RTCs due to the physical requirements of their implementation. Therefore, it is often preferable to select many "easy" RTCs rather than a few difficult (or impossible) ones to implement. Hence, there is a problem of selecting a set of RTCs that is as easy as possible to enforce in the circuit (ideally, no enforcement at all would be necessary, just static timing analysis to confirm that each RTC in the set of RTCs already holds). By "enforce" it is meant to implement an RTC in a physical implementation of an asynchronous circuit.

A naïve selection of RTCs may yield a set of RTCs that is infeasible. An infeasible set of RTC is unimplementable due to logically contradicting RTCs. Alternatively, the set of RTCs may be difficult to enforce in the physical implementation of the asynchronous circuit due to two-sided constraints on some signals or signal edges or a requirement for delay padding on some paths in the circuit, thereby deteriorating the performance of the asynchronous circuit.

A key technical problem to be solved is to determine a set of RTCs which meet the following criterion: the set is suitable for preventing the asynchronous circuit from entering two or more bad states in which a correctness property of the asynchronous circuit is violated. The computation of RTCs is a necessary design step to make a design for the production of an asynchronous circuit that operates correctly. However, using existing tools and methods it takes hours or even days to select a suitable set of RTCs.

In practice, it may be difficult to find a feasible set of RTCs. Additionally, there may be a high number of feasible RTCs due to a combinatorial explosion of the possibilities, however it may be difficult to find a good set of RTCs that can provide an optimum version of the asynchronous circuit. Note that randomly generating a few sets of RTCs and selecting the best of these is unlikely to yield a good result since only a tiny fraction of the solution space is explored by such an approach, and the probability of the best solution to be there is very small.

SUMMARY

It is desirable to provide a method of selecting relative timing constraints that overcomes or mitigates one or more of the above-mentioned problems.

According to a first aspect of the disclosure there is provided a method of selecting relative timing constraints for enforcing in an asynchronous circuit, comprising selecting one or more sets of relative timing constraints comprising a first set of relative timing constraints, wherein the first set of relative timing constraints meets the following criteria: i) the first set is suitable for preventing the asynchronous circuit from entering two or more bad states in which a correctness property of the asynchronous circuit is violated, and ii) the first set comprises a plurality of relative timing constraints, wherein each relative timing constraint within the first set is associated with a bad state whose associated relative timing constraints comprise this relative timing constraint but no other relative timing constraint that is implied by another relative timing constraint in the first set.

Optionally, the first set comprises a plurality of relative timing constraints, wherein each relative timing constraint within the first set is associated with a bad state whose associated relative timing constraints comprise this relative timing constraint but no other relative timing constraint that is the same as, but not otherwise implied by, another relative timing constraint in the first set, or each relative timing constraint within the first set is associated with a bad state whose associated relative timing constraints comprise this relative timing constraint but no other relative timing constraint that is implied by, but not the same as, another relative timing constraint in the first set.

Optionally, prior to selecting the first set of relative timing constraints, the method comprises identifying the two or more bad states, and identifying one or more relative timing constraints associated with each bad state that are suitable for preventing the asynchronous circuit from entering the bad state, wherein the first set comprises at least two of the relative timing constraints that were identified.

Optionally, the first set of relative timing constraints is suitable for preventing the asynchronous circuit from entering all bad states.

Optionally, the first set of relative timing constraints meets the following criterion: each relative timing constraint within the first set does not logically imply another relative timing constraint within the first set.

Optionally, the first set of relative timing constraints meets the following criterion: the first set is feasible.

Optionally, the first set of relative timing constraints meets the following criterion: each relative timing constraint within the first set does not logically contradict another relative timing constraint in the first set.

Optionally, the method comprises selecting an additional set of relative timing constraints, wherein the additional set of relative timing constraints meets the following criteria: iii) the additional set is suitable for preventing the asynchronous circuit from entering one or more bad states in which a correctness property of the asynchronous circuit is violated, and iv) the additional set comprises one or more relative timing constraints wherein the, or each, relative timing constraint within the additional set has a margin greater than or equal to a margin of one of the relative timing constraints in the first set, wherein the margin is representative of how easily a set of relative timing constraints can be implemented such that a relative timing constraint having a larger margin is easier to implement than a relative timing constraint having smaller margin.

Optionally, the method comprises defining a minimum margin for the first set, the minimum margin of the first set being the smallest margin of at least a portion of the relative timing constraints within the first set, and the additional set of relative timing constraints meets the following criteria: v) the additional set comprises a plurality of relative timing constraints wherein each relative timing constraint within the additional set has a margin greater than or equal to the minimum margin of the first set.

Optionally, the additional set of relative timing constraints meets the following criteria: v) the additional set comprises a plurality of relative timing constraints, wherein each relative timing constraint within the additional set is associated with a bad state whose associated relative timing constraints comprise this relative timing constraint but no other relative timing constraint that is implied by another relative timing constraint in the additional set.

Optionally, the additional set comprises a plurality of relative timing constraints, wherein each relative timing constraint within the additional set is associated with a bad state whose associated relative timing constraints comprise this relative timing constraint but no other relative timing constraint that is the same as, but not otherwise implied by, another relative timing constraint in the additional set, or each relative timing constraint within the additional set is associated with a bad state whose associated relative timing constraints comprise this relative timing constraint but no other relative timing constraint that is implied by, but not the same as, another relative timing constraint in the additional set.

Optionally, prior to selecting the additional set of relative timing constraints, the first set of relative timing constraints is evaluated to determine if it meets suitability criteria, and if the suitability criteria are not met, then the criterion iv) is not applied.

Optionally, the method comprises selecting an additional set of relative timing constraints, wherein the additional set of relative timing constraints meets the following criteria: iii) the additional set is suitable for preventing the asynchronous circuit from entering one or more bad states in which a correctness property of the asynchronous circuit is violated, and iv) the additional set comprises one or more relative timing constraints wherein the, or each, relative timing constraint within the additional set has a margin greater than a margin of one of the relative timing constraints in the first set, wherein the margin is representative of how easily a set of relative timing constraints can be implemented such that a relative timing constraint having a larger margin is easier to implement than a relative timing constraint having smaller margin.

Optionally, the method comprises defining a minimum margin for the first set, the minimum margin of the first set being the smallest margin of at least a portion of the relative timing constraints within the first set, and the additional set of relative timing constraints meets the following criteria: v) the additional set comprises a plurality of relative timing constraints wherein each relative timing constraint within the additional set has a margin greater than the minimum margin of the first set.

Optionally, the additional set of relative timing constraints meets the following criteria: v) the additional set comprises a plurality of relative timing constraints, wherein each relative timing constraint within the additional set is associated with a bad state whose associated relative timing constraints comprise this relative timing constraint but no other relative timing constraint that is implied by another relative timing constraint in the additional set.

Optionally, the additional set comprises a plurality of relative timing constraints, wherein each relative timing constraint within the additional set is associated with a bad state whose associated relative timing constraints comprise this relative timing constraint but no other relative timing constraint that is the same as, but not otherwise implied by, another relative timing constraint in the additional set, or each relative timing constraint within the additional set is associated with a bad state whose associated relative timing constraints comprise this relative timing constraint but no other relative timing constraint that is implied by, but not the same as, another relative timing constraint in the additional set.

Optionally, prior to selecting the additional set of relative timing constraints, the first set of relative timing constraints is evaluated to determine if it meets suitability criteria, and if the suitability criteria are not met, then the criterion iv) is not applied.

Optionally, the method comprises selecting a plurality of sets of relative timing constraints, comprising the first set of relative timing constraints, and selecting an additional set of relative timing constraints, wherein the additional set of relative timing constraints meets the following criteria iii) the additional set is suitable for preventing the asynchronous circuit from entering one or more bad states in which a correctness property of the asynchronous circuit is violated, and iv) the additional set comprises one or more relative timing constraints wherein the, or each, relative timing constraint within the additional set has a margin greater than or equal to a margin of one of the relative timing constraints in the plurality of sets of relative timing constraints, wherein the margin is representative of how easily a set of relative timing constraints can be implemented such that a relative timing constraint having a larger margin is easier to implement than a relative timing constraint having smaller margin.

Optionally, the method comprises defining a minimum margin for each of the plurality of sets of relative timing constraints, the minimum margin of each set being the smallest margin of at least a portion of the relative timing constraints within the set, and the additional set of relative timing constraints meets the following criteria: v) the additional set comprises a plurality of relative timing constraints wherein each relative timing constraint within the additional set has a margin greater than or equal to the smallest minimum margin of the plurality of sets of relative timing constraints.

Optionally, the additional set of relative timing constraints meets the following criteria v) the additional set comprises a plurality of relative timing constraints, wherein each relative timing constraint within the additional set is associated with a bad state whose associated relative timing constraints comprise this relative timing constraint but no other relative timing constraint that is implied by another relative timing constraint that is in the additional set.

Optionally, the additional set comprises a plurality of relative timing constraints, wherein each relative timing constraint within the additional set is associated with a bad state whose associated relative timing constraints comprise this relative timing constraint but no other relative timing constraint that is the same as, but not otherwise implied by, another relative timing constraint in the additional set, or each relative timing constraint within the additional set is associated with a bad state whose associated relative timing constraints comprise this relative timing constraint but no other relative timing constraint that is implied by, but not the same as, another relative timing constraint in the additional set.

Optionally, prior to selecting the additional set of relative timing constraints, each of the plurality of sets of relative timing constraints is evaluated to determine if they meet suitability criteria, and any sets of relative timing constraints not meeting the suitability criteria are excluded from the plurality of sets of relative timing constraints in application of the criterion iv).

Optionally, the method comprises selecting a plurality of sets of relative timing constraints, comprising the first set of relative timing constraints, and selecting an additional set of relative timing constraints, wherein the additional set of relative timing constraints meets the following criteria: iii) the additional set is suitable for preventing the asynchronous circuit from entering one or more bad states in which a correctness property of the asynchronous circuit is violated, and iv) the additional set comprises one or more relative timing constraints wherein the, or each, relative timing constraint within the additional set has a margin greater than a margin of one of the relative timing constraints in the plurality of sets of relative timing constraints, wherein the margin is representative of how easily a set of relative timing constraints can be implemented such that a relative timing constraint having a larger margin is easier to implement than a relative timing constraint having smaller margin.

Optionally, the method comprises defining a minimum margin for each of the plurality of sets of relative timing constraints, the minimum margin of each set being the smallest margin of at least a portion of the relative timing constraints within the set, and the additional set of relative timing constraints meets the following criteria: v) the additional set comprises a plurality of relative timing constraints wherein each relative timing constraint within the additional set has a margin greater than the smallest minimum margin of the plurality of sets of relative timing constraints.

Optionally, the additional set of relative timing constraints meets the following criteria v) the additional set comprises a plurality of relative timing constraints, wherein each relative timing constraint within the additional set is associated with a bad state whose associated relative timing constraints comprise this relative timing constraint but no other relative timing constraint that is implied by another relative timing constraint that is in the additional set.

Optionally, the additional set comprises a plurality of relative timing constraints, wherein each relative timing constraint within the additional set is associated with a bad state whose associated relative timing constraints comprise this relative timing constraint but no other relative timing constraint that is the same as, but not otherwise implied by, another relative timing constraint in the additional set, or each relative timing constraint within the additional set is associated with a bad state whose associated relative timing constraints comprise this relative timing constraint but no other relative timing constraint that is implied by, but not the same as, another relative timing constraint in the additional set.

Optionally, prior to selecting the additional set of relative timing constraints, each of the plurality of sets of relative timing constraints is evaluated to determine if they meet suitability criteria, and any sets of relative timing constraints not meeting the suitability criteria are excluded from the plurality of sets of relative timing constraints in application of the criterion iv).

According to a second aspect of the disclosure there is provided a computer system comprising a module configured as an automated integrated circuit design tool comprising a relative timing constraint selector for selecting relative timing constraints for implementation in an asynchronous circuit and configured to select one or more sets of relative timing constraints comprising a first set of relative timing constraints, wherein the first set of relative timing constraints meets the following criteria: i) the first set is suitable for preventing the asynchronous circuit from entering two or more bad states in which a correctness property of the asynchronous circuit is violated, and ii) the first set comprises a plurality of relative timing constraints, wherein each relative timing constraint within the first set is associated with a bad state whose associated relative timing constraints comprise this relative timing constraint but no other relative timing constraint that is implied by another relative timing constraint in the first set.

It will be appreciated that the computer system of the second aspect may include features set out in the first aspect and can incorporate other features as described herein.

According to a third aspect of the disclosure there is provided an asynchronous circuit implementing relative timing constraints selected using a method of selecting relative timing constraints for implementation in an asynchronous circuit, comprising selecting one or more sets of relative timing constraints comprising a first set of relative timing constraints, wherein the first set of relative timing constraints meets the following criteria: i) the first set is suitable for preventing the asynchronous circuit from entering two or more bad states in which a correctness property of the asynchronous circuit is violated, and ii) the first set comprises a plurality of relative timing constraints, wherein each relative timing constraint within the first set is associated with a bad state whose associated relative timing constraints comprise this relative timing constraint but no other relative timing constraint that is implied by another relative timing constraint in the first set.

It will be appreciated that the asynchronous circuit of the third aspect may include features set out in the first aspect and can incorporate other features as described herein.

BRIEF DESCRIPTION OF THE DRAWINGS

The disclosure is described in further detail below by way of example and with reference to the accompanying drawings, in which:

FIG. 1A is a schematic of a logic circuit that requires timing constraints to work correctly, FIG. 1B is a signal transition graph (STG) that specifies the desired interaction between the logic circuit of FIG. 1A and its environment, and FIG. 1C is a portion of a state graph of the composition of the logic circuit of FIG. 1A and the STG in FIG. 1B;

FIG. 2A is a schematic of a D-latch, FIG. 2B an STG that specifies the interaction between the D-latch of FIG. 2A and its environment, and FIG. 2C is a table showing sets of RTCs associated with bad states in a state graph of the composition of the D-latch of FIG. 2A and the STG of FIG. 2B;

FIG. 4C is a table showing sets of RTCs and their margins associated with the bad states for the logic circuit of FIG. 4A, and FIG. 4D is a table showing sets of relative timing constraints, their relative timing constraints, and the minimum margin associated with each set of relative timing constraints for the logic circuit of FIG. 4A;

FIG. 6 is a table of relative timing constraints for the logic circuit of FIG. 4A which can be selected using the method of FIG. 5;

DESCRIPTION

Figures 3A, 3B:
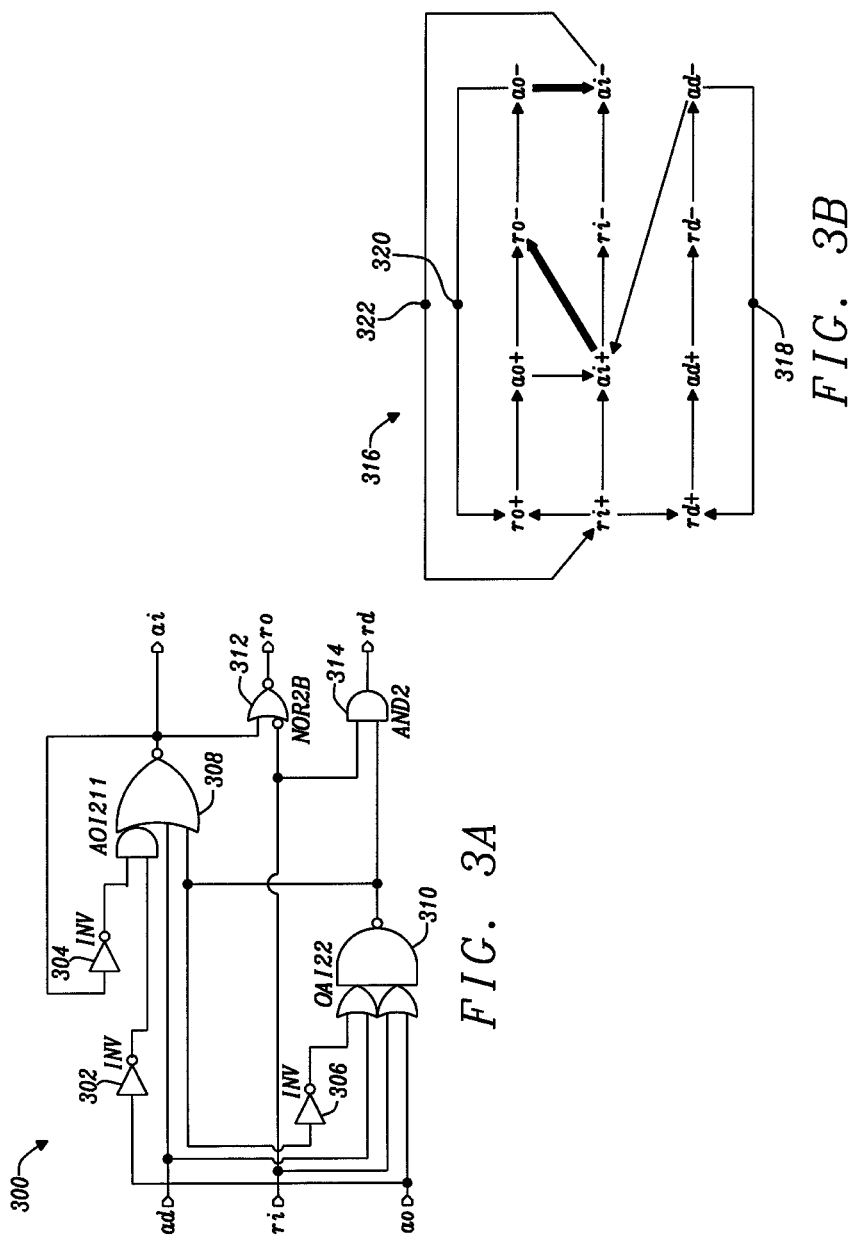
FIG. 3A is a schematic of a logic circuit.
FIG. 3B is an STG that specifies the interaction between the logic circuit of FIG. 3A and its environment.

FIG. 2A is a schematic of a D-latch 200 comprising an inverter 202 and an AND-OR gate 204. The D-latch 200 receives input signals C, D and provides output signal Q. The inverter 202 outputs an internal signal INV. FIG. 2B is an STG 206 that specifies the interaction between the D-latch 200 and its environment.

FIG. 2C is a table showing systems of constraints 208, 210, 212, 214 each associated with a bad state, where each system of constraints 208, 210, 212, 214 comprises one or more constraints. Each system of constraints 208, 210, 212, 214 refers to one of the four bad states in a state graph (not shown) of the composition of the D-latch 200 and the STG 206. If a bad state is reached then all constraints within the associated system of constraints 208, 210, 212, 214 hold simultaneously. By "hold" it is meant that the condition described by a constraint is met during operation of the D-latch 200. A constraint 216 is repeated in the system of constraints 210, 212, 214, and a constraint 218 is repeated in the system of constraints 212, 214.

A naïve selection method for selecting a set of RTCs may, for example, be based on the greedy algorithm. A naïve selection method based on the greedy algorithm would likely select the constraint 216 as it appears in three of the systems of constraints 210, 212, 214. The only remaining system of constraints is then the system of constraints 208 that contains a single constraint 220. The set of RTCs to be enforced in the D-latch 200 would then include the negations of constraints 216 and 220, i.e. D(C+)<d(D+) and D(D+)<d(C+). This is an example of a logical contradiction between the negations of the constraints 216, 220. As the minimal timing must be less than or equal to the maximal timing for a given signal, d(D+) D(D+) and d(C+) D(C+), and therefore the set of RTCs is infeasible and thus cannot be implemented. Therefore in this case, even though there is a feasible solution comprised of constraints D(D+)<d(C+), D(D−)<d(C−), D(D+)<d(C−), D(INV−)<d(Q+), the naïve greedy selection algorithm fails to identify it, and instead identifies an infeasible solution. Another naïve selection method for selecting a set of RTCs may be exhaustive enumeration as is described below.

As the D-latch 200 is a reasonably simple circuit compared to others that may be considered, a prior art selection algorithm using an exhaustive enumeration process may be sufficient to identify a suitable set of RTCs within a reasonable period of time. However, other asynchronous circuits that are more complex than the D-latch 200 can result in so many feasible sets of RTCs that it is impractical to enumerate them all. For example, FIG. 3A shows a logic circuit 300 comprising inverters 302, 304, 306, a logic gate 308, a logic gate 310, a logic gate 312 and a logic gate 314. The logic circuit 300 receives the input signals ad, ri, ao and provides the output signals ai, ro, rd.

FIG. 3B is an STG 316 that specifies the interaction between the logic circuit 300 and its environment. The prior art selection algorithm, corresponding to an exhaustive enumeration algorithm used to compute all possibilities, was run for several hours and was terminated after having already identified a few hundred thousand sets of RTCs.

If there are a large number of feasible sets of RTCs, enumerating them all (exhaustive enumeration) is impractical. As such, it is desirable to provide an improved selection algorithm to ensure optimum sets of RTCs are generated in a reasonable time period.

Figure 4A:
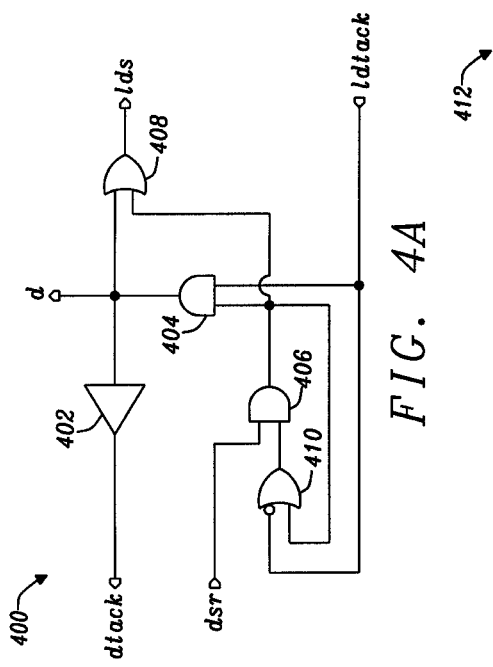
FIG. 4A is a schematic of a logic circuit.
Figure 4B:
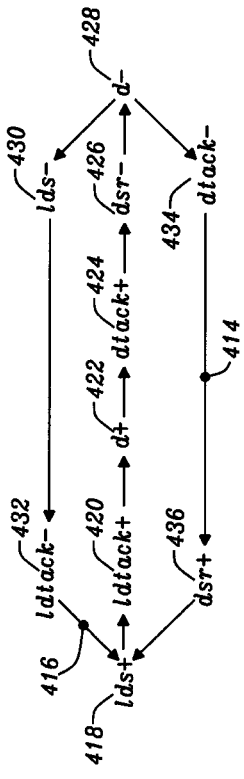
FIG. 4B is an STG that specifies the interaction between the logic circuit of FIG. 4A and its environment.

FIG. 4A is a schematic of a logic circuit 400 comprising a buffer 402, an AND gate 404, an AND gate 406, an OR gate 408 and an OR gate with an inverted input 410. The logic circuit 400 is a VME bus controller and it receives input signals dsr, ldtack and provides output signals d, lds, dtack. FIG. 4B is an STG 412 that specifies the interaction between the logic circuit 400 and its environment. FIG. 4B shows: tokens 414, 416, a rising edge of lds (lds+) 418, a rising edge of ldtack (ldtack+) 420, a rising edge of d (d+) 422, a rising edge of dtack (dtack+) 424, a falling edge of dsr (dsr−) 426, a falling edge of d (d−) 428, a falling edge of lds (lds−) 430, a falling edge of ldtack (ldtack−) 432, a falling edge of dtack (dtack−) 434, a rising edge of dsr (dsr+) 436.

FIG. 4C is a table showing the systems of constraints 438, 440, 442 (also labelled $O_1$, $O_2$ and $O_3$, respectively) associated with the three bad states of the state graph of the composition of the circuit 400 in FIG. 4A and the STG 412 in FIG. 4B. In FIG. 4C the timing constraints have already had their relations flipped to provide the RTCs. A constraint 444 occurs in two of the systems of constraints 438, 442. Margins 447 are shown next to each RTC. A margin associated with an RTC is an estimate of how easy it is to enforce this RTC, as such it is a measure of how easily a given RTC can be physically implemented in an asynchronous circuit. The margin may be calculated using a number of different methods based on delays of logic gates and other components, as well as other relevant criteria in evaluating how easily a constraint can be implemented. Alternatively, it may simply be user assigned.

The constraints have also been labelled A to G to aid in the clarity of the description, as shown in FIG. 4C. The constraints 444, 456, 448, 452, 446, 450, 454 may be referred to by the letters A, B, C, D, E, F and G, respectively. There are logical implications between constraints as follows:

constraint 446 (E) implies constraint 448 (C); constraint 450 (F) implies constraint 452 (D); and constraint 454 (G) implies constraint 456 (B).

FIG. 4D is a table showing sets of RTCs, their RTCs, and the minimum margin associated with each set of RTCs. For a pair of constraints within a single set of RTCs where one implies the other, the implied constraint is redundant. As such, sets of RTCs including a pair of constraints where one implies the other are not included in the table in FIG. 4D. Additionally, it is fairly straightforward to exclude such sets of RTCs. Shown in FIG. 4D are sets of RTCs 458, 460, 462, 464, 466, 468, 470, 472, 474, 476, 478, 480, 482, 484, 486, 488, 490, 492, 494. The sets of RTCs may be referred to as "solutions" because they represent various sets of RTCs that can each be used to prevent an asynchronous circuit from entering a bad state. Therefore the table shown in FIG. 4D may be referred to as a solution list. FIG. 4D is a list of all possible solutions for the present example.

The twelve sets of RTCs 460, 464, 468, 470, 472, 474, 480, 482, 484, 486, 488, 492 out of the nineteen, are non-minimal with respect to set inclusion. Non-minimal solutions contain redundant RTCs which are not necessary for the asynchronous circuit to work correctly. For example, set of RTCs 460 (Solution 2) is a superset of set of RTCs 458 (Solution 1), as Solution 2 includes all of Solution 1's RTCs. It is desirable to exclude non-minimal solutions from consideration, as dropping redundant constraints from a non-minimal solution would result in a minimal solution that is easier to enforce.

Unfortunately, there can be many such non-minimal solutions, and it is not trivial to avoid computing such solutions during the search process: to know that Solution 2 is non-minimal one has to know that Solution 1 or Solution 3 exists; however, the solutions are computed one-by-one, in an unpredictable order, and it can happen that many non-minimal solutions are computed before a minimal one. In fact, it is more likely that a non-minimal solution is computed as the non-minimal solutions usually outnumber minimal ones. In practice, it often means that the selection algorithm spends a lot of time enumerating solutions, and only a small fraction of them are minimal.

Figure 5:
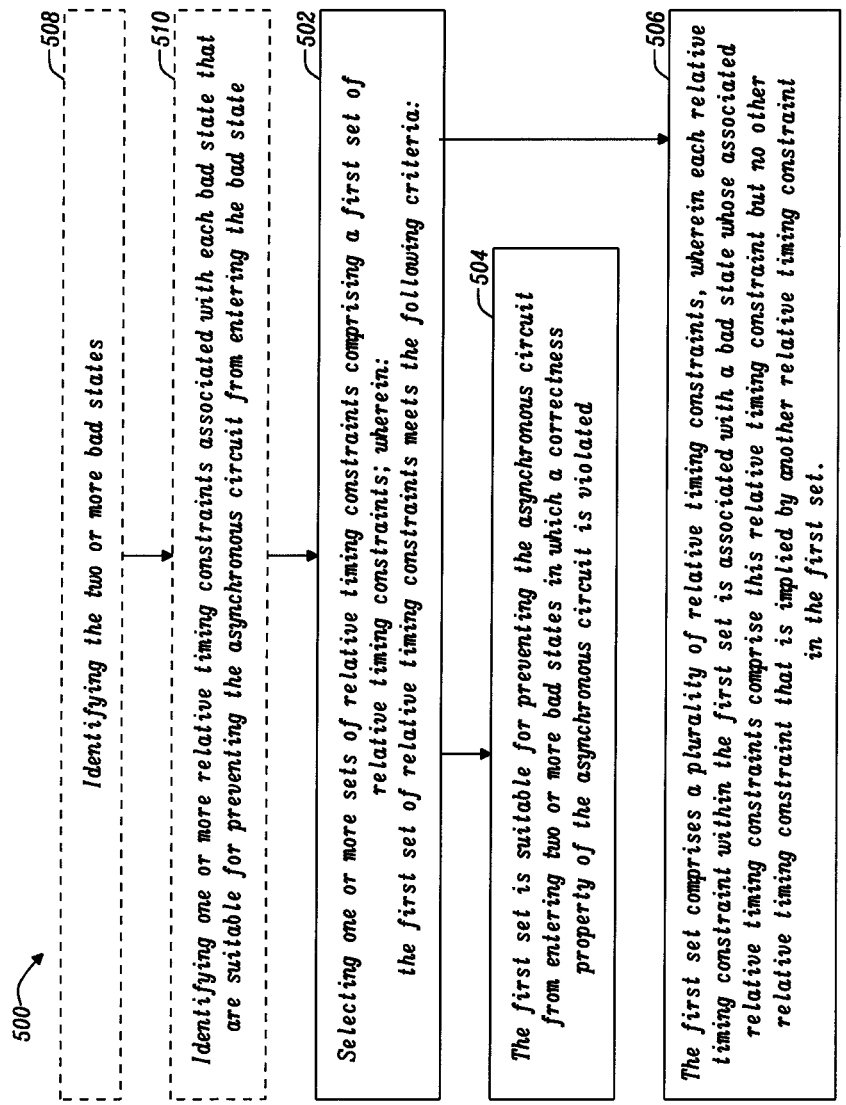
FIG. 5 is a flow chart of a method of selecting relative timing constraints for implementation in an asynchronous circuit in accordance with a first embodiment of the present disclosure.

FIG. 5 is a flow chart of a method 500 of selecting RTCs for enforcing in an asynchronous circuit in accordance with a first embodiment of the present disclosure. The method 500 comprises selecting a first set of RTCs at a step 502, the first set of RTCs meets the following criteria. The first set is suitable for preventing the asynchronous circuit from entering two or more bad states in which a correctness property of the asynchronous circuit is violated, as shown at criteria 504 and the first set comprises a plurality of RTCs in which: each RTC within the first set is associated with a bad state whose associated RTCs comprise this RTC but no other RTC that is implied by another RTC in the first set, as shown at criteria 506. It will be appreciated that an RTC implies itself.

It will be appreciated that referring to the "first" set is to aid in the clarity of the description and is not intended to be limiting. For example, multiple sets of RTCs may be selected before and after the first set of RTCs.

A first example of the application of the method 500 is as follows. Consider three systems of constraints Oa, Ob, Oc each associated with a bad state. System of constraints Oa is comprised of constraints ca and cb; system of constraints Ob is comprised of the constraint ca; and system of constraints Oc is comprised of the constraint cb. None of the constraints ca, cb logically imply each other. However, as a constraint logically implies itself, cb implies cb and ca implies ca. For simplicity, we will assume that the relation sign was already flipped in the constraints ca, cb to form the RTCs.

Using the method 500 a set of RTCs comprising ca, cb will be selected at the step 502. This set of RTCs meets the criterion 504 as it is suitable for preventing the asynchronous circuit from entering three bad states. Each of the two RTCs ca, cb are associated with a bad state whose associated RTCs comprise this RTC but no other RTC that is implied by another RTC in the first set: Ob contains no constraints other than ca, and Oc contains no constraints other than cb. Therefore, the condition outlined previously is met and criterion 506 is met.

A second example of the application of the method 500 is as follows. Consider two systems of constraints Od, Oe each associated with a different bad state. System of constraints Od includes constraints cc and cd; system of constraints Oe includes the constraint ce. The constraint ce logically implies the constraint cd. For simplicity, we will assume that the relation sign was already flipped in constraints cc, cd, ce to form the RTCs.

Using the method 500 a set of RTCs comprising cc and ce will not be selected at the step 502. This set of RTCs meets the criterion 504 as it is suitable for preventing the asynchronous circuit from entering two bad states. However, the only set of constraints containing cc is Od, which also contains cd, and cd is logically implied by ce. Therefore, the condition discussed previously is not met, and so criterion 506 is not met.

The method 500 removes non-minimal solutions from the solution space, before any solutions are known. Therefore, only the minimal solutions are computed, which often results in much shorter runtimes in determining suitable sets of RTCs.

In a further embodiment each RTC within the first set may be associated with a bad state whose associated RTCs comprise this RTC but no other RTC that is the same as, but not otherwise implied by, another RTC in the first set.

In a further embodiment each RTC within the first set may associated with a bad state whose associated RTCs comprise this RTC but no other RTC that is implied by, but not the same as, another RTC in the first set.

Prior to selecting the first set of RTCs at step 502, the method may identify the two or more bad states, at a step 508 and identifying one or more RTCs associated with each bad state that are suitable for preventing the asynchronous circuit from entering the bad state at a step 510. The first set comprises at least two of the RTCs that were identified in step 510. Steps 508 and 510 may be carried out using the prior art algorithm described in "Abstract Interpretation Techniques for the Verification of Timed Systems" (PhD Thesis) by Robert Clarisó Viladrosa. It will be appreciated that other algorithms may be used to carry out the steps 508, 510 in accordance with the understanding of the skilled person.

In a preferred embodiment, for criteria 504 the first set of RTCs is suitable for preventing the asynchronous circuit from entering all bad states.

Application of the method 500 may comprise additional criteria in selecting the first set of RTCs as follows: each RTC within the first set does not logically imply another RTC within the first set and/or the first set is feasible and/or each RTC within the first set does not logically contradict another RTC in the first set. The first set is feasible if there are no logical contradictions between the RTCs in the first set.

It will be appreciated that although the method 500 has been described for identifying a single set of RTCs (the first set of RTCs), the method 500 may be applied multiple times to select multiple different sets of RTCs.

The step 502 may be implemented by reducing the problem to Boolean Satisfiability (SAT) and then using a SAT solver, which is a technique for implementing efficient search. SAT is a problem of finding a satisfying assignment to variables occurring in a Boolean expression that turns the expression to TRUE. The step 502 may be translated to SAT as follows.

A SAT instance (i.e. a Boolean expression) may be used to yield sets of RTCs, such as the set of RTCs shown in FIG. 4D. The actual formulae comprising a SAT instance are not necessary for basic understanding, as the meaning of each formula is explained herein, however the formulae will be sufficient for the skilled person to implement the selection algorithm.

The input of the translation algorithm is several sets $O_i$ consisting of RTCs $c_{ij}$—these were associated with the bad states in the state graph, e.g. 438, 440, 442 in FIG. 4C. We assume that these RTCs are already negated, i.e. have the form of the left-hand side of the inequality being less than the right-hand side, as shown in FIG. 4C. It is possible for the same RTC to occur in several $O_i$. We assume that each $O_i$ is reduced, i.e. within it no RTC can logically imply another one, and it is straightforward to achieve this.

The SAT instance has the following Boolean variables: for each RTC c occurring in any of $O_i$, there is: a variable $s_c$ to represent that c has been selected; a variable to represent that c holds (i.e. it is either selected or implied by some selected RTC); and a variable $i_c$ to represent whether c is implied by some other RTC that holds. The SAT solver does not have to branch on $i_c$ and $h_c$ as their values are computable from the values of variables $s_c$.

Once the SAT solver finds a solution, i.e. an assignment to variables that satisfies all the conditions detailed below, the corresponding sets of RTCs can be obtained from it by taking all the selected constraints, i.e. the set {c=1}. In what follows we will identify the solutions of the SAT instance with this set of RTCs.

A solution of the SAT instance is called minimal if there is no smaller solution with respect to a set inclusion. Note that a non-minimal set of RTCs is suboptimal as it has more RTCs than necessary, and so is no better than any minimal set of RTCs contained within it. Additionally, it can be much worse, as the extra RTCs may be difficult to implement or even make the set of RTCs infeasible.

The SAT instance is the conjunction of the following Boolean expressions.

The expressions for computing $i_c$ and $h_c$ are as follows: an RTC c is implied if there is another RTC c' that holds and implies c, as shown by equation (1):

$$\forall c: i_c \Leftrightarrow \bigvee_{\substack{c' \Rightarrow c \\ c' \neq c}} h_{c'} \qquad (1)$$

An RTC holds if it is either selected or implied by another RTC, as shown by equation (2):

$$\forall c: h_c \Leftrightarrow (s_c \vee i_c) \qquad (2)$$

Optimisation clauses ensure that implied constraints are not selected. It is pointless to select an RTC that is implied by another RTC, so no RTC should be both selected and implied, as shown by equation (3):

$$\forall c: (\overline{s_c} \vee \overline{i_c}) \qquad (3)$$

The advantage is that some non-minimal sets of RTCs are removed from the set of solutions, though there is still no guarantee the solution is minimal. Note that adding Equation (3) to the SAT instance is optional, as all non-minimal solutions are eliminated by Equation (5) or alternatively by Equations (6) and (7). However, adding it may increase the performance.

The following expression ensures that no pair of selected RTCs within a set contradict one another, as the overall RTCs would then be contradictory. The sets of RTCs must not contain a pair of contradictory RTCs as shown by equation (4):

$$\forall c, c' \text{ contradicting each other: } (\overline{s_c} \vee \overline{s_{c'}}) \qquad (4)$$

Note that it is still possible for the set of RTCs to contain a larger subset of contradicting RTCs, so a subsequent check for contradiction will be desirable, but it will be performed outside of the SAT solver.

In summary, step 502 and the criteria 504, 506 apply the following restriction to the selection of RTCs when selecting sets of RTCs: whenever an RTC c is selected, there must be a bad state in the state graph whose system of RTCs $O_i$ contains c but no other implied or selected RTC c'.

In other words, selecting the RTC c must be necessary to prevent the logic circuit from entering some bad state with the associated system of RTCs $O_i$ containing c, as described in equation (5):

$$\forall c: s_c \Rightarrow \bigvee_{O: c \in O} \bigwedge_{c' \in O \setminus \{c\}} \overline{h_{c'}} \qquad (5)$$

Indeed, if some $O_i$ has such a c' (which is either selected or implied by yet another selected RTC c"), then $O_i$ is resolved without the need for c; otherwise $O_i$ contains an RTC ĉ implied by c, so ĉ can be selected instead of c, leading to an easier to enforce set of RTCs. Note that c"≠c due to all $O_i$ being reduced. These clauses guarantee the minimality of the sets of RTCs. If some c can be dropped while leaving all the $O_i$ resolved, then each $O_i$ had some $h_{c'}=1$ such that RTC c does not logically imply some other RTC c' such that equation (5) would be violated.

Equation (5) directly corresponds to intuition but yields a poor SAT encoding. A more efficient encoding can be obtained as follows: for each $O=\{c_0, c_1, \ldots, c_{n-1}\}$, we create variables $\text{pref}_i^O$, $\text{suff}_i^O$, and $\text{essential}_i^O$ (the SAT solver does not need to branch on them, as their values will be computable from variables $h_c$) and add the following expressions to the SAT instance:

$$\text{pref}_0^O \Leftrightarrow 1 \qquad (6)$$

$$\text{pref}_i^O \Leftrightarrow \overline{h_{c_{i-1}}} \wedge \text{pref}_{i-1}^O, \quad 0 < i \leq n-1$$

$$\text{suff}_{n-1}^O \Leftrightarrow 0$$

$$\text{suff}_i^O \Leftrightarrow \overline{h_{c_{i+1}}} \wedge \text{suff}_{i+1}^O, \quad 0 \leq i < n-1$$

$$\text{essential}_i^O \Leftrightarrow \text{pref}_i^O \wedge \text{suff}_i^O, \quad 0 \leq i < n$$

Furthermore, the following expressions are added to the SAT instance for each c:

$$\forall c: s_c \Rightarrow \bigvee_{O: c \in O} \text{essential}_c^O \qquad (7)$$

Note that all the variables in Equations (6) and (7) occur only in the positive phase, so one can replace $\Leftrightarrow$ above with $\Rightarrow$ in these equations, which further simplifies the encoding.

Application of the method 500 for the table shown in FIG. 2C yields the following feasible set of RTCs that can be implemented: D(D+)<d(C+), D(D−)<d(C−), D(D+)<d(C−), D(INV−)<d(Q+).

It will be appreciated that selection algorithms other than the SAT solver may be used to implement the step 502, in accordance with the understanding of the skilled person. For example, other suitable selection algorithms may be based on a satisfiability modulo theories (SMT) solver, an integer linear programming (ILP) solver, or some other suitable solver. The step 502 may also be implemented without using a solver, for example, by using a branch-and-bound or another search algorithm.

FIG. 6 shows a table of sets of RTCs which can be selected using the method 500 for the circuit in FIG. 4A. The table contains a reduced list of possible solutions when compared to FIG. 4D. The table in FIG. 6 comprises all the minimal solutions.

It will be appreciated that the solution list shown by the table in FIG. 6 may never be constructed by the algorithm as each set of RTCs can be identified individually using the method 500. Additionally, if the method 500 is run several times with the same input, it may select different sets of RTCs (different solutions) each time.

Working through step 502 of the method 500 yields the table shown in FIG. 6 as follows for Solutions 1 to 4 in FIG. 4D. The set of RTCs 458 (Solution 1) meets the criteria 504, 506. The set of RTCs 460 (Solution 2) does not meet criterion 506 because it contains both C and D which are both present in the system of constraints 440 and none of the other system of constraints 438, 442 contains C or D. The set of RTCs 462 (Solution 3) meets the criteria 504, 506. The set of RTCs 464 (Solution 4) does not meet the criteria 506 as E logically implies C which is associated with the same bad state as D, and D is not present in another system of constraints.

It will be clear to the skilled person how the remaining Solutions are included or omitted using the method 500.

When applying a SAT solver for step 502 to evaluate the criteria 504, 506 each solution of the SAT instance corresponds to a minimal set of RTCs such that no two RTCs in this set RTCs contradict each other, or one RTC implies some other (bigger subsets of contradictory or implied RTCs are still possible). The minimality is ensured by the clauses and implemented by step 506 of the method 500 of the present disclosure as described previously, and it greatly reduces the number of sets of RTCs to be considered, and so it is often possible to enumerate all the solutions and pick the best one. E.g. for the logic circuit 300 (a TC benchmark) mentioned above, though the overall number of sets of RTCs is huge, the number of minimal ones is just a few hundred thousand, and they can be enumerated in a reasonable time. However, this is still inefficient, as the runtime of the selection algorithm would dominate the runtime of the timing analysis. Hence, further improvements are desirable.

To select good sets of RTCs, it is desirable to rank the sets of RTCs somehow. For this, one can apply a number of qualitative and quantitative criteria in the order of their importance. E.g., feasible sets of RTCs are clearly to be preferred to infeasible ones, as the latter cannot be implemented. One of the most important RTC-level metrics is the margin, i.e. the difference of timing between the two competing paths encoded in the RTC. The smaller this margin is, the more difficult it is to implement this RTC, and a negative margin often requires some delay padding to be enforced. This metric can be applied to the sets of RTCs by defining the margin of a set of RTCs as the worst margin of all its RTCs (its minimum margin). The minimum margin is one of the most important metrics for ranking the sets of RTCs. The minimum margin of a set of RTCs is the margin associated with the RTC within the set that is the most difficult to enforce. Therefore, it is typically desirable to have a set of RTCs with the largest minimum margin possible.

Therefore, the ranking criteria could be as follows (in the order of importance): feasible sets of RTCs are preferred—alternatively, sets of RTCs with no strong cyclic conflicts as defined in Qualifying Relative Timing Constraints for Asynchronous Circuit, Jotham Vaddaboina Manoranjan and Kenneth S. Stevens, 2016 22nd IEEE International Symposium on Asynchronous Circuits and Systems (ASYNC) is preferred; some other criteria; sets of RTCs with smaller margin is preferred; some other criteria.

Figure 7:
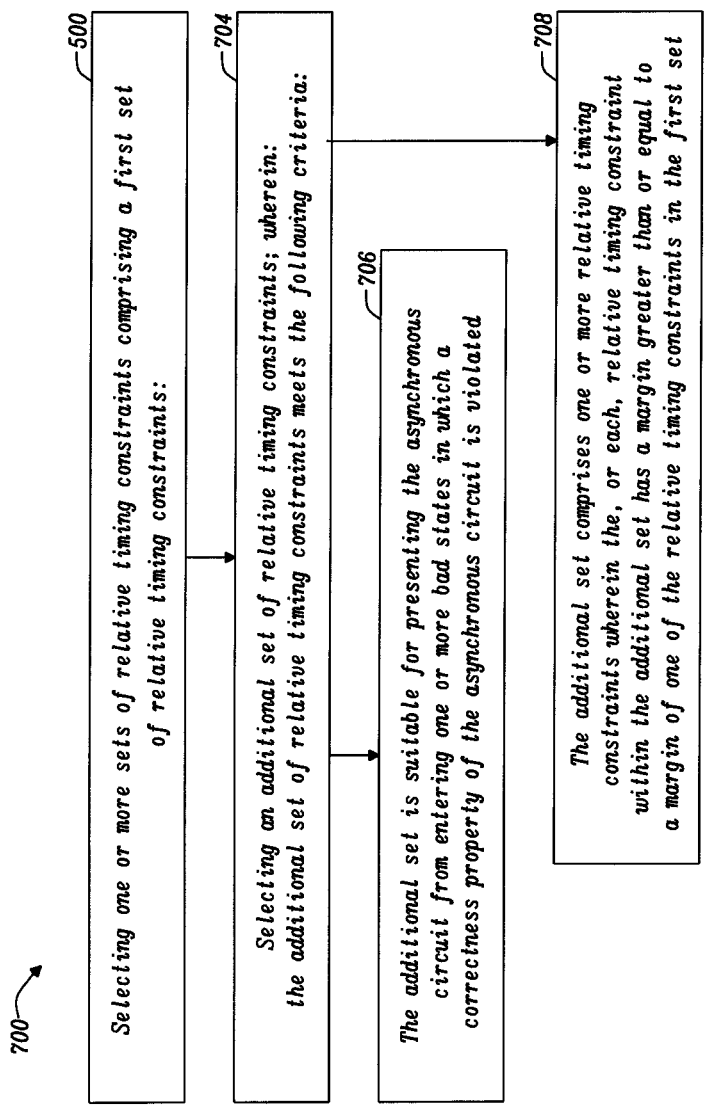
FIG. 7 is a flow chart of a method of selecting relative timing constraints for implementation in an asynchronous circuit in accordance with a second embodiment of the present disclosure.

FIG. 7 is a flow chart of a method 700 of selecting RTCs for implementation in an asynchronous circuit in accordance with a second embodiment of the present disclosure.

The method 700 comprises the steps of the method 500 as discussed previously. Common reference numerals between figures represent common features. The method 700 may comprise identifying a margin for each of the RTCs in the first set and comprises selecting an additional set of RTCs at a step 704, in which the additional set of relative timing constraints meets the following criteria: the additional set is suitable for preventing the asynchronous circuit from entering one or more bad states in which a correctness property of the asynchronous circuit is violated (criteria 706), and the additional set comprises one or more RTCs in which the, or each, RTC within the additional set has a margin greater than or equal to the margin of one of the RTCs in the first set (criteria 708).

It will be appreciated that the first set may not be the set of RTCs selected immediately prior to application of the method 700.

The margin is representative of how easily an RTC can be implemented: an RTC having a larger margin is easier to implement than an RTC having a smaller margin.

In a further embodiment, the method 700 may further comprise defining a minimum margin for the first set. The minimum margin of a set of RTCs is the smallest margin of at least a portion of the RTCs within the set. In this embodiment, the additional set of RTCs comprises a plurality of RTCs in which each RTC within the additional set has a margin greater than or equal to the minimum margin of the first set.

The method 700 may be summarised as follows: whenever a solution (i.e. a set of RTCs) is computed, all RTCs with smaller margins than the minimal margin of this solution can be removed from further consideration.

It will be appreciated that for the additional set of RTCs, the criteria applied to the first set and outlined in the method 500, may also be applied as follows: the additional set comprises a plurality of relative timing constraints, wherein each relative timing constraint within the additional set is associated with a bad state whose associated relative timing constraints comprise this relative timing constraint but no other relative timing constraint that is implied by another relative timing constraint in the additional set.

In a further embodiment each RTC within the additional set may be associated with a bad state whose associated RTCs comprise this RTC but no other RTC that is the same as, but not otherwise implied by, another RTC in the additional set.

In a further embodiment each RTC within the additional set may associated with a bad state whose associated RTCs comprise this RTC but no other RTC that is implied by, but not the same as, another RTC in the additional set.

It will be appreciated that the steps outlined in methods 500, 700 may be applied and repeated until a suitable set or set of RTCs is identified.

It will be appreciated that in an alternative embodiment, the criterion 708 may alternatively be as follows: the additional set comprises one or more RTCs in which the, or each, RTC within the additional set has a margin greater than the margin of one of the RTCs in the first set. In this embodiment, a process where the methods 500, 700 are repeatedly applied would converge faster than the case where the margin may be greater than or equal to the margin of one of the RTCs in the first set. However, suitable sets of RTCs may be missed. A hybrid algorithm could be formed by switching between the "greater than or equal to" and the "greater than" conditions at different phases of the process.

It will be appreciated that the method 700 and the related embodiments described herein may be applied for the selection of one or multiple additional sets of RTCs.

In a further embodiment, prior to identifying a margin for the RTC for the first set of RTCs, the first set of RTCs may be evaluated to determine if it meets some other suitability criteria. If the suitability criteria are not met, then the margin is not considered and RTCs having a smaller margin are not removed from the possible solution space. This further embodiment may be summarised as follows: whenever a solution (i.e. a set of RTCs) is computed that satisfies all the criteria which are more important than the margin (e.g. feasibility), all RTCs with smaller margins than the minimal margin of this solution can be removed from further consideration.

The suitability criteria may be criteria a set of RTCs is judged on that are more important ranking criteria for a set of RTCs than its minimum margin. For example, one could require that the selected set of RTCs is feasible, i.e. there are no logical contradictions between the RTCs in the set, or that there are no two-sided constraints, or there are no strong cyclic conflicts as defined in Qualifying Relative Timing Constraints for Asynchronous Circuit, Jotham Vaddaboina Manoranjan and Kenneth S. Stevens, 2016 22nd IEEE International Symposium on Asynchronous Circuits and Systems (ASYNC). These ranking criteria may be qualitative, for example on the scale of true or false. In this specific embodiment the minimum margin of the first set is not used to remove RTCs from consideration unless these suitability criteria have been satisfied by the first set.

As discussed previously, it will be appreciated that although the method 500 has been described for identifying a single set of RTCs (the first set of RTCs), the method 500 may be applied multiple times to select multiple different sets of RTCs (a plurality of sets of RTCs). Therefore, in an alternative embodiment, the method 700 may be applied after multiple sets of RTCs have been selected.

In this embodiment an additional set of RTCs may meet the following criteria: the additional set comprises one or more RTCs in which the, or each, RTC within the additional set has a margin greater than or equal to a margin of one of the RTCs in a plurality of sets of RTCs.

In this alternative embodiment a minimum margin may be defined for each of the plurality of sets of RTCs, where the minimum margin of each set is the smallest margin of at least a portion of the RTCs within the set. The additional set may comprise a plurality of RTCs where each RTC within the additional set has a margin greater than or equal to the smallest minimum margin of the plurality of sets of RTCs.

Prior to selecting the additional set of RTCs, each of the plurality of sets of RTCs may be evaluated to determine if they meet suitability criteria and any sets of RTCs not meeting the suitability criteria will have their margins excluded from consideration when selecting the additional set.

Consideration of the margins enables a reduction in runtime in determining the set of RTCs by exploiting information from the previously computed solutions and dynamically adjusting the search process. For example, with reference to FIG. 6, if set of RTCs 478 (Solution 11) is the first computed solution, and it meets the suitability criteria, we know that its minimum margin is −1. Therefore, it is possible to exclude the RTCs with a margin of less than −1 from further consideration. In the present example, constraint 454 (constraint G) with the margin −5 would be excluded from further consideration, and so set of RTCs 490 (Solution 17) and set of RTCs 494 (Solution 19) would be removed from the solution list. Therefore, the inferior solutions (17 and 19) with the minimum margin −5 will not be computed by application of the method 700, thereby reducing runtime. If in the next step, the set of RTCs 466 (Solution 5) is computed and determined to meet the suitability criteria, then more RTCs can be excluded as the set of RTCs 466 (Solution 5) has minimum margin 0, i.e. greater than the minimum margin −1 of set of RTCs 478 (Solution 11). Thus RTCs with margins less than 0 may be excluded from further consideration, namely constraints 456 (B) with margin −1 and 450 (F) with margin −1 (constraint 454 (G) with margin −5 had already been excluded). Hence, the set of RTCs 476 (Solution 10), which is inferior to the already computed set of RTCs 466 (Solution 5) due to a smaller margin, will not be computed, thereby further reducing the runtime (Solution 11 also has a smaller margin than Solution 5, but it had been computed prior to Solution 5 in the above explanation).

As soon as the solution enumeration process, either implemented by the method 500 or another suitable procedure, finds a set of RTCs with the optimal values for all the ranking criteria (relating to the suitability criteria described previously) preceding the margin (usually there are only few such criteria and they are qualitative, e.g. 'feasible' or 'no strong conflict cycles') and has a margin m, one can exclude from further consideration all the RTCs with the margin smaller than m from all systems $O_i$, as any sets of RTCs including such a constraint will be inferior to the already generated set of RTCs due to a worse (i.e. smaller) margin and the fact that the generated set of RTCs is optimal with respect to all the preceding ranking criteria. This can be encoded at the level of SAT by adding clauses $\overline{s}_c$ for each constraint c to be excluded from further consideration.

Thus, all the sets of RTCs computed from now on will have margin m or greater. This optimisation is applied every time such a set of RTCs is found and its margin is better than the previously best one, which greatly reduces the runtime of the selection algorithm without losing the best sets of RTCs from the solution list.

The outline of the selection algorithm which is sufficient for the skilled person to implement the method could be as follows:
1) construct the SAT instance φ as described above;
2) set the margin m:=−∞;
3) if φ is unsatisfiable then stop, returning the best (or several best) sets of RTCs computed so far; if no sets of RTCs were computed yet, the algorithm fails;

4) If ϕ is satisfiable, the SAT solver returns a satisfying assignment yielding a set S of RTCs;

5) Remove the computed sets of RTCs from the set of solutions of ϕ by adding to ϕ the clause $V_{c \in S} \overline{s_c}$;

6) If the computed set of RTCs is optimal with respect to all the criteria which are more important than the margin, and minimum_margin(S)>m, then set m:=minimum_margin(S) and exclude from consideration each RTC c with margin(c) <m by adding to ϕ the clause $\overline{s_c}$;

7) Go to 3).

The present disclosure provides improved automated integrated circuit design. The computation of RTCs is a necessary design step to make a design for the production of an asynchronous circuit that operates correctly. However, using existing tools and methods it takes hours or even days to select a suitable set of RTCs. The tools and methods of the present disclosure reduce this time to an order of minutes rather than an order of hours or days, by using an intelligent selection method that only selects sets of RTCs that are minimal solutions.

An asynchronous circuit manufactured with a design tool according to this disclosure can be designed to satisfy correctness properties including, but not limited to, output-persistence and conformation to the environment.

Therefore, an asynchronous circuit manufactured with a design tool according to this disclosure can be designed to have output-persistence, meaning that the risk of a circuit malfunctioning in operation is reduced, even when the design time is relatively short.

Furthermore, conformation to the environment can be guaranteed, meaning that the risk of an unexpected signal causing the environment (the rest of the system comprising the asynchronous circuit) to malfunction can be reduced, even when the design time is relatively short.

Figures 8A, 8B:
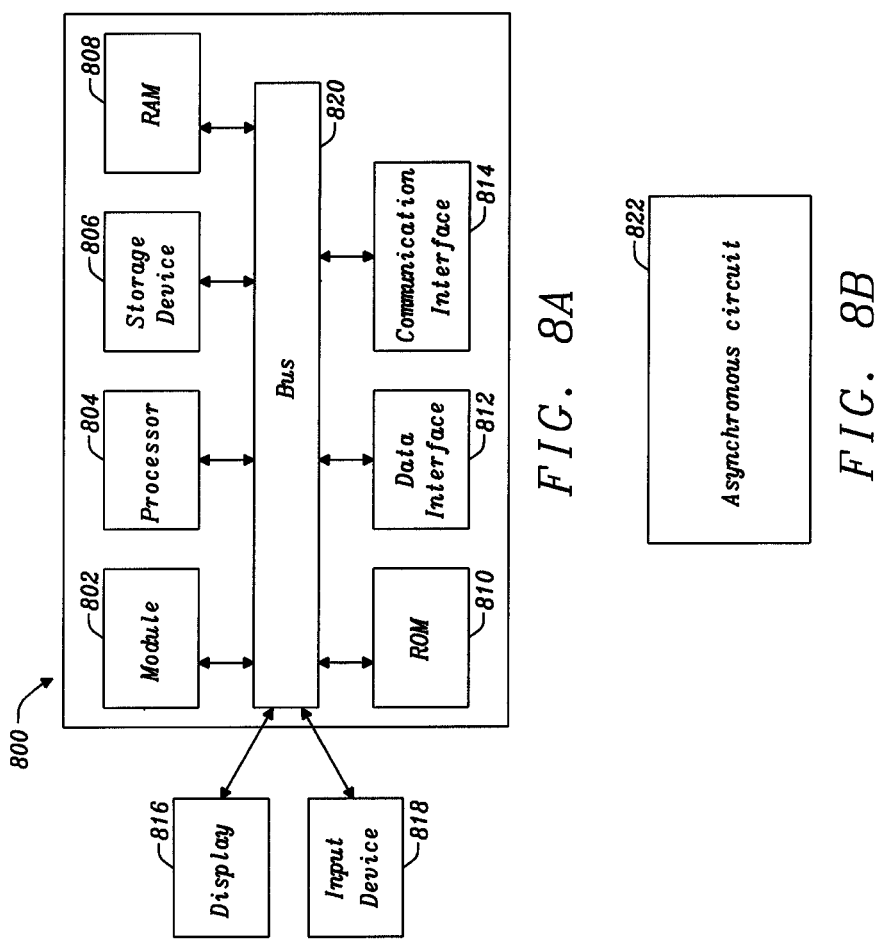
FIG. 8A is a schematic of a computer system comprising an automated integrated circuit design tool comprising a relative timing constraint selector for selecting relative timing constraints for implementation in an asynchronous circuit in accordance with a third embodiment of the present disclosure.
FIG. 8B is a schematic of an asynchronous circuit implementing relative timing constraints in accordance with a fourth embodiment of the present disclosure.

FIG. 8A depicts a computer system 800 which comprises specially modified components for carrying out the methods of the present disclosure. The computer system 800 comprises a module 802 which is configured as an automated integrated circuit design tool comprising an RTC selector for automating the design of integrated circuits and for selecting RTCs for implementation in an asynchronous circuit in accordance with a third embodiment of the present disclosure. The methods 500, 700, may be run using the RTC selector.

The computer system 800 may comprise a processor 804, a storage device 806, RAM 808, ROM 810, a data interface 812, a communications interface 814, a display 816, and an input device 818. The computer system 800 may comprise a bus 820 to enable communication between the different components.

The computer system 800 may be configured to load an application. The instructions provided by the application may be carried out by the processor 804. The application may be the automated integrated circuit design tool comprising the RTC selector.

A user may interact with the computer system 800 using the display 816 and the input device 818 to instruct the computer system 800 to implement the methods of the present disclosure in the design of an asynchronous circuit.

FIG. 8B shows a schematic of an asynchronous circuit 802 implementing RTCs in accordance with a fourth embodiment of the present disclosure. The RTCs implemented in the asynchronous circuit were selected using one of the methods 500, 700, and in accordance with the understandings of the skilled person.

The methods 500, 700, disclosed herein may be implemented using a selection algorithm.

Various improvements and modifications may be made to the above without departing from the scope of disclosure.

What is claimed is:

1. A method of selecting relative timing constraints for enforcing in an asynchronous circuit, comprising:
   selecting one or more sets of relative timing constraints comprising a first set of relative timing constraints; wherein:
   the first set of relative timing constraints meets the following criteria:
   i) the first set is suitable for preventing the asynchronous circuit from entering two or more bad states in which a correctness property of the asynchronous circuit is violated; and
   ii) the first set comprises a plurality of relative timing constraints, wherein each relative timing constraint within the first set is associated with a bad state whose associated relative timing constraints comprise this relative timing constraint but no other relative timing constraint that is implied by another relative timing constraint in the first set.

2. The method of claim 1, wherein the first set comprises a plurality of relative timing constraints, wherein:
   each relative timing constraint within the first set is associated with a bad state whose associated relative timing constraints comprise this relative timing constraint but no other relative timing constraint that is the same as, but not otherwise implied by, another relative timing constraint in the first set; or
   each relative timing constraint within the first set is associated with a bad state whose associated relative timing constraints comprise this relative timing constraint but no other relative timing constraint that is implied by, but not the same as, another relative timing constraint in the first set.

3. The method of claim 1, wherein prior to selecting the first set of relative timing constraints, the method comprises:
   identifying the two or more bad states; and
   identifying one or more relative timing constraints associated with each bad state that are suitable for preventing the asynchronous circuit from entering the bad state; wherein:
   the first set comprises at least two of the relative timing constraints that were identified.

4. The method of claim 1, wherein the first set of relative timing constraints is suitable for preventing the asynchronous circuit from entering all bad states.

5. The method of claim 1, wherein the first set of relative timing constraints meets the following criterion:
   each relative timing constraint within the first set does not logically imply another relative timing constraint within the first set.

6. The method of claim 1, wherein, the first set of relative timing constraints meets the following criterion:
   the first set is feasible.

7. The method of claim 1, wherein the first set of relative timing constraints meets the following criterion:
   each relative timing constraint within the first set does not logically contradict another relative timing constraint in the first set.

8. The method of claim 1, comprising:
   selecting an additional set of relative timing constraints; wherein:
   the additional set of relative timing constraints meets the following criteria:
   iii) the additional set is suitable for preventing the asynchronous circuit from entering one or more bad states in which a correctness property of the asynchronous circuit is violated; and
iv) the additional set comprises one or more relative timing constraints wherein the, or each, relative timing constraint within the additional set has a margin greater than or equal to a margin of one of the relative timing constraints in the first set; wherein:
the margin is representative of how easily a set of relative timing constraints can be implemented such that a relative timing constraint having a larger margin is easier to implement than a relative timing constraint having smaller margin.

9. The method of claim 8, comprising:
defining a minimum margin for the first set, the minimum margin of the first set being the smallest margin of at least a portion of the relative timing constraints within the first set; and
the additional set of relative timing constraints meets the following criteria:
v) the additional set comprises a plurality of relative timing constraints wherein each relative timing constraint within the additional set has a margin greater than or equal to the minimum margin of the first set.

10. The method of claim 8, wherein the additional set of relative timing constraints meets the following criteria:
v) the additional set comprises a plurality of relative timing constraints, wherein each relative timing constraint within the additional set is associated with a bad state whose associated relative timing constraints comprise this relative timing constraint but no other relative timing constraint that is implied by another relative timing constraint in the additional set.

11. The method of claim 10 wherein the additional set comprises a plurality of relative timing constraints, wherein:
each relative timing constraint within the additional set is associated with a bad state whose associated relative timing constraints comprise this relative timing constraint but no other relative timing constraint that is the same as, but not otherwise implied by, another relative timing constraint in the additional set; or
each relative timing constraint within the additional set is associated with a bad state whose associated relative timing constraints comprise this relative timing constraint but no other relative timing constraint that is implied by, but not the same as, another relative timing constraint in the additional set.

12. The method of claim 8, wherein:
prior to selecting the additional set of relative timing constraints, the first set of relative timing constraints is evaluated to determine if it meets suitability criteria; and
if the suitability criteria are not met, then the criterion iv) is not applied.

13. The method of claim 1, comprising:
selecting an additional set of relative timing constraints; wherein:
the additional set of relative timing constraints meets the following criteria:
iii) the additional set is suitable for preventing the asynchronous circuit from entering one or more bad states in which a correctness property of the asynchronous circuit is violated; and
iv) the additional set comprises one or more relative timing constraints wherein the, or each, relative timing constraint within the additional set has a margin greater than a margin of one of the relative timing constraints in the first set; wherein:
the margin is representative of how easily a set of relative timing constraints can be implemented such that a relative timing constraint having a larger margin is easier to implement than a relative timing constraint having smaller margin.

14. The method of claim 1, comprising:
selecting a plurality of sets of relative timing constraints, comprising the first set of relative timing constraints; and
selecting an additional set of relative timing constraints; wherein:
the additional set of relative timing constraints meets the following criteria:
iii) the additional set is suitable for preventing the asynchronous circuit from entering one or more bad states in which a correctness property of the asynchronous circuit is violated; and
iv) the additional set comprises one or more relative timing constraints wherein the, or each, relative timing constraint within the additional set has a margin greater than or equal to a margin of one of the relative timing constraints in the plurality of sets of relative timing constraints; wherein:
the margin is representative of how easily a set of relative timing constraints can be implemented such that a relative timing constraint having a larger margin is easier to implement than a relative timing constraint having smaller margin.

15. The method of claim 14, comprising:
defining a minimum margin for each of the plurality of sets of relative timing constraints, the minimum margin of each set being the smallest margin of at least a portion of the relative timing constraints within the set; and
the additional set of relative timing constraints meets the following criteria:
v) the additional set comprises a plurality of relative timing constraints wherein each relative timing constraint within the additional set has a margin greater than or equal to the smallest minimum margin of the plurality of sets of relative timing constraints.

16. The method of claim 14, wherein the additional set of relative timing constraints meets the following criteria:
v) the additional set comprises a plurality of relative timing constraints, wherein each relative timing constraint within the additional set is associated with a bad state whose associated relative timing constraints comprise this relative timing constraint but no other relative timing constraint that is implied by another relative timing constraint that is in the additional set.

17. The method of claim 16 wherein the additional set comprises a plurality of relative timing constraints, wherein:
each relative timing constraint within the additional set is associated with a bad state whose associated relative timing constraints comprise this relative timing constraint but no other relative timing constraint that is the same as, but not otherwise implied by, another relative timing constraint in the additional set; or
each relative timing constraint within the additional set is associated with a bad state whose associated relative timing constraints comprise this relative timing constraint but no other relative timing constraint that is implied by, but not the same as, another relative timing constraint in the additional set.

18. The method of claim 14, wherein:
prior to selecting the additional set of relative timing constraints, each of the plurality of sets of relative timing constraints is evaluated to determine if they meet suitability criteria; and any sets of relative timing constraints not meeting the suitability criteria are excluded from the plurality of sets of relative timing constraints in application of the criterion iv).

19. The method of claim 1, comprising:

selecting a plurality of sets of relative timing constraints, comprising the first set of relative timing constraints; and selecting an additional set of relative timing constraints; wherein:

the additional set of relative timing constraints meets the following criteria:
   iii) the additional set is suitable for preventing the asynchronous circuit from entering one or more bad states in which a correctness property of the asynchronous circuit is violated; and
   iv) the additional set comprises one or more relative timing constraints wherein the, or each, relative timing constraint within the additional set has a margin greater than a margin of one of the relative timing constraints in the plurality of sets of relative timing constraints; wherein:

the margin is representative of how easily a set of relative timing constraints can be implemented such that a relative timing constraint having a larger margin is easier to implement than a relative timing constraint having smaller margin.

20. A computer system comprising a module configured as an automated integrated circuit design tool comprising a relative timing constraint selector for selecting relative timing constraints for implementation in an asynchronous circuit and configured to:

select one or more sets of relative timing constraints comprising a first set of relative timing constraints; wherein:

the first set of relative timing constraints meets the following criteria:
   i) the first set is suitable for preventing the asynchronous circuit from entering two or more bad states in which a correctness property of the asynchronous circuit is violated; and
   ii) the first set comprises a plurality of relative timing constraints, wherein each relative timing constraint within the first set is associated with a bad state whose associated relative timing constraints comprise this relative timing constraint but no other relative timing constraint that is implied by another relative timing constraint in the first set.

21. An asynchronous circuit implementing relative timing constraints selected using a method of selecting relative timing constraints for implementation in an asynchronous circuit, comprising:

selecting one or more sets of relative timing constraints comprising a first set of relative timing constraints; wherein:

the first set of relative timing constraints meets the following criteria:
   i) the first set is suitable for preventing the asynchronous circuit from entering two or more bad states in which a correctness property of the asynchronous circuit is violated; and
   ii) the first set comprises a plurality of relative timing constraints, wherein each relative timing constraint within the first set is associated with a bad state whose associated relative timing constraints comprise this relative timing constraint but no other relative timing constraint that is implied by another relative timing constraint in the first set.

* * * * *